United States Patent [19]

Sheppard, Jr. et al.

[11] Patent Number: 5,968,250
[45] Date of Patent: Oct. 19, 1999

[54] KAOLIN COMPOSITION FOR USE ELECTRODEPOSITION PAINTS

[75] Inventors: Robert Reynolds Sheppard, Jr., Macon, Ga.; Karen Ann Gruber, Hamilton, N.J.

[73] Assignee: Engelhard Corporation, Iselin, N.J.

[21] Appl. No.: 08/870,501

[22] Filed: Jun. 6, 1997

[51] Int. Cl.$^6$ .................................. C09D 5/44; C09C 1/42
[52] U.S. Cl. ..................... 106/486; 106/484; 204/490; 204/499; 205/50; 205/320; 205/323; 205/333; 428/457; 428/454; 428/689
[58] Field of Search ................... 106/484, 486; 204/490, 499; 205/50, 320, 323, 333; 428/454, 457, 689

[56] References Cited

U.S. PATENT DOCUMENTS

| | | | |
|---|---|---|---|
| 2,992,936 | 7/1961 | Rowland | 106/486 |
| 4,007,154 | 2/1977 | Schimmel et al. | 523/435 |
| 4,186,124 | 1/1980 | Schimmel et al. | 525/528 |
| 4,279,661 | 7/1981 | Strauch et al. | 106/288 B |
| 4,485,259 | 11/1984 | Jerabek et al. | 564/292 |
| 4,598,105 | 7/1986 | Weber et al. | 523/215 |
| 4,738,726 | 4/1988 | Pratt et al. | 106/487 |
| 5,011,534 | 4/1991 | Berube et al. | 106/486 |
| 5,169,443 | 12/1992 | Willis et al. | 106/486 |
| 5,207,822 | 5/1993 | Manasso et al. | 106/486 |
| 5,393,716 | 2/1995 | Light et al. | 106/484 |
| 5,411,587 | 5/1995 | Willis et al. | 106/486 |
| 5,451,306 | 9/1995 | Nakamura et al. | 204/181.7 |
| 5,454,865 | 10/1995 | Ginn et al. | 106/484 |
| 5,522,924 | 6/1996 | Smith et al. | 106/484 |
| 5,624,488 | 4/1997 | Forbus et al. | 106/484 |
| 5,645,635 | 7/1997 | Behl et al. | 106/486 |

FOREIGN PATENT DOCUMENTS

| | | | |
|---|---|---|---|
| 0136743 | 4/1985 | European Pat. Off. | C09D 3/58 |
| 2250512 | 6/1992 | United Kingdom | C09D 5/44 |
| 91/17128 | 11/1991 | WIPO | 106/486 |

OTHER PUBLICATIONS

International Search Report for PCT Application No. PCT/US98/08966 mailed Aug. 20, 1998.

*Primary Examiner*—Anthony Green
*Attorney, Agent, or Firm*—Raymond F. Keller

[57] ABSTRACT

Disclosed are kaolin compositions of at least one hydrous kaolin characterized by a particle size distribution where 98% of the particles are less than about $2\mu$, 90% are less than about $0.5\mu$ and the median particle size is less than about $0.3\mu$. Also disclosed is a process which involves the steps (i) preparing an aqueous slurry of at least one hydrous kaolin; (ii) separating the particles from said slurry so that the particle size distribution is such that 98% of the particles are less than about $2\mu$, 90% are less than about $0.5\mu$ and a median particle size is less than about $0.3\mu$; and (iii) drying said separated particles. Pigment pastes and electrodeposition paints containing said compositions as well as cationic electrodeposition of said paint on a substrate and the article of manufacture prepared thereby are disclosed.

16 Claims, No Drawings

KAOLIN COMPOSITION FOR USE ELECTRODEPOSITION PAINTS

BACKGROUND OF THE INVENTION

1. Field of the Invention

This invention relates to novel hydrous kaolin compositions and their use as pigment and pigment extenders in electrodeposition paints.

2. Description of Related Art

In D. S. Young and A. T. Gronet, "Pigmentation of Electrocoatings," in *Electrodeposition of Coatings*, published by Am Chemical, chapter 7, page 106, (1980) kaolin is disclosed as an extender pigment in electrocoat systems.

There is still a need, however, for kaolin compositions which can make up a higher concentration of the pigment used in paint than current standard kaolin grades without increasing the viscosity of the pigment paste, increasing agglomeration in the paint bath or reducing the smoothness of the cured film.

SUMMARY OF THE INVENTION

This invention relates to novel kaolin compositions, a process for preparing such compositions and electrodeposition paints containing said compositions.

In one embodiment, this invention relates to kaolin compositions comprising at least one hydrous kaolin characterized by a particle size distribution where 98% of the particles are less than about $2\mu$, 90% are less than about $0.5\mu$ and the median particle size is less than about $0.3\mu$.

In another embodiment, this invention relates to a kaolin composition prepared by the steps comprising (i) preparing an aqueous slurry of at least one hydrous kaolin; (ii) separating the particles from said slurry so that the particle size distribution is such that 98% of the particles are less than about $2\mu$, 90% are less than about $0.5\mu$ and a median particle size is less than about $0.3\mu$; and (iii) drying said separated particles.

In still another embodiment, this invention relates to pigment pastes and electrodeposition paints containing said kaolin compositions.

In yet another embodiment, this invention relates to the cationic electrodeposition of said paint on an article and the article of manufacture prepared thereby.

DESCRIPTION OF THE PREFERRED EMBODIMENT

As previously stated, the kaolin compositions of this invention are intended for use as pigments and pigment extenders in electrodeposition paints.

In the formation of paint compositions, and especially electrodepositable paint compositions, an important factor is the introduction of pigments/pigment extenders into the coating composition. These pigments are typically ground in a pigment grinding vehicle which acts as a dispersing agent to form a paste, and the resultant pigment paste is incorporated into the coating composition to give the coating composition proper color, opacity, application and film properties.

The kaolin compositions of this invention may function as the sole pigment or as a pigment extender combined with pigments well known in the art. Generally titanium dioxide is the chief white pigment; other white pigments and/or extender pigments include antimony oxide, zinc oxide, basic lead carbonate, basic lead sulfate, barium carbonate, China clay, calcium carbonate, aluminum silicate, silica, magnesium carbonate, magnesium silica, among others. Color pigments may also be employed, for example, cadmium yellow, cadmium red, carbon black, phthalocyanine blue, chrome yellow, toluidine red, hydrated iron oxide, among others.

Suitable pigment grinding vehicles are well known to those of ordinary skill in the art. Typical grinding vehicles useful for the purposes of this invention are the resinous vehicles known in art for use in cationic electrodeposition systems and include those described in P. I. Kordomenos and J. D. Nordstrom, "Polymer Compositions For Cationic Electrodepositable Coatings," in the *Journal of Polymer Coatings*, pages 33–41, Vol. 54, No. 686, March 1982. This reference is hereby incorporated by reference for its teachings of the compositions suitable for use in cationic electrodeposition systems.

The pigment pastes of the present invention are prepared by grinding or dispersing a pigment into the grind vehicle in a manner well known in the art. The pigment paste comprises as essential ingredients the grind vehicle and at least one kaolin composition of this invention; however, the paste may, in addition, contain optional ingredients such as other pigments/pigment extenders, plasticizers, wetting agents, surfactants or defoamers.

Grinding is usually accomplished by the use of ball mills, sand mills, Cowles dissolvers, continuous attritors and the like until the pigment has been reduced to the desired size and preferably has been wet by and dispersed by the grinding vehicle. After grinding, the particle size of the pigment should be in the range of 10 microns or less, preferably as small as practicable. Generally, a Hegman grind gauge reading of about 6–8 is usually employed.

Preferably, grinding is conducted in an aqueous dispersion of the vehicle. The amount of water present in the aqueous grind should be sufficient to produce a continuous aqueous phase. The aqueous grind usually contains about 30 to 70 percent by weight total solids. The use of more water merely reduces the effective capacity of the mill and, while less water can be employed, higher resultant viscosity may create problems in certain instances. Although the pigment paste is usually prepared in the presence of water, water is not absolutely necessary as organic liquids can be used to prepare non-aqueous pigment pastes which are subsequently dispersible based compositions.

The use of the grinding vehicle is preferably minimized or absent altogether; however, typically the pigment-to-grinding vehicle binder ratio in the grinding step is usually maintained within the range of about 2/1 to 7/1 by weight.

For a general review of pigment grinding and paint formulation, reference is made to:

D. H. Parker, Principles of Surface Coating Technology, Interscience Publishers, New York (1965)

R. L. Yates, Electropainting, Robert Draper Ltd., Teddington, England (1966)

H. F. Payne, Organic Coating Technology, Vol. 2, Wiley and Sons, New York (1961).

These references are hereby incorporated by reference for their teachings regarding pigment grinding, paint formulation and electropainting.

The pigment paste of the present invention is usually combined with one or more resinous vehicles known in art for cationic electrodeposition. The cationic electrodepositable resins are well known in the art and need not be described in any detail. Examples of suitable resins, in addition to those mentioned herein above, include those described in U.S. Pat. Nos. 3,799,854 to Jerabek and 3,839,252 to Bosso et al. The portions of these references which describe suitable electrodepositable resins are hereby incorporated by reference.

Enough of the pigment paste is used so that the final electrodepositable composition (electrodepositable resin plus pigment paste) has the properties required for electrodeposition. In most instances, the final electrodepositable composition has a pigment-to-binder (electro-depositable resin plus grind vehicle) weight ratio of between about 0.05 to about 0.5.

For electrodeposition, a bath containing about 5 to 25 percent by weight solids, that is, pigment plus resinous vehicle, is usually, employed. This aqueous composition is then placed in contact with an electrically-conductive anode and an electrically-conductive cathode in an electric circuit. While in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts are usually employed. The current density is usually between 0.25 ampere and 15 amperes per square foot, and tends to decrease during electrodeposition. The method of the invention is applicable to the coating of any conductive substrate and especially, metal, such as steel, aluminum, copper and the like.

After deposition, the coating is cured at elevated temperatures by any convenient method, such as in baking ovens or with banks of infrared heat lamps. The final electrodepositable paint may contain, in addition to the pigment paste and the electrodeposition resin, adjuvant resins such as aminoplast resins for crosslinking, solvents, anti-oxidants, surfactants and other adjuvants typically employed in an electrodeposition process.

The kaolin compositions of this invention comprise at least one hydrous kaolin characterized by a particle size distribution where 98% of the particles are less than about $2\mu$, 90% are less than about $0.5\mu$ and the median particle size is less than about $0.3\mu$. The Gardner-Coleman oil adsorption of said composition is preferably less than about 70 lb oil/100 lb of composition.

The hydrous kaolin is generally represented by the formula $Al_2O_3.2SiO_2.2H_2O$, where the water is present as interstitial water. The hydrous kaolin of this invention preferably has not been subject to calcination conditions, e.g., temperatures in excess of about 500° C., preferably not in excess of about 350° C.

The kaolin compositions of this invention are characterized by having a particle size distribution where 98% of the particles are less than about $2\mu$, 90% are less than about $0.5\mu$ and the median particle size is less than about $0.3\mu$. The Gardner-Coleman oil adsorption of said composition is preferably less than about 70 lb oil/100 lb composition.

For the purposes of this invention particle size is determined by conventional sedimentation techniques using Micromeretics, Inc.'s SEDIGRAPH®5100 particle size analyzer and the Gardner-Coleman oil adsorption is determined using ASTM test procedure D1483-84.

The kaolin compositions of this invention may be prepared by the steps comprising (i) preparing an aqueous slurry of at least one hydrous kaolin (ii) separating the particles from said slurry so that the particle size distribution is such that 98% of the particles are less than about $2\mu$, 90% are less than about $0.5\mu$ and a median particle size of less than about $0.3\mu$; and (iii) drying said separated particles.

The hydrous kaolin useful in this process preferably has a Gardner-Coleman oil adsorption of less than about 70 lb oil/100 lb. In this process the crude hydrous kaolin is dispersed in water to form a high solids aqueous slurry, usually at least about 50% by weight solids, preferably at least about 58% by weight. To aid in the dispersion of the crude kaolin it is desirable to add an effective amount of at least one dispersant. Typically, suitable dispersants are inorganic dispersants such as ammonia and phosphates. Such phosphates include diammonium phosphate, dipotassium phosphate, disodium phosphate, monoammonium phosphate, monopotassium phosphate, monosodium phosphate, potassium tripolyphosphate, sodium acid pyrophosphate, sodium hexametaphosphate, sodium tripolyphosphate, tetrapotassium pyrophosphate, tetrasodium pyrophosphate, tripotassium phosphate, trisodium phosphate, urea phosphate and mixtures thereof. These dispersants may be preformed and added to the slurry or formed within the slurry. The slurry should be approximately neutral, e.g., pH of ~6–8, preferably, about 6.5–7.5. The pH of the slurry should be adjusted, if necessary, by the addition of acid or base so that the final pH of the slurry is approximately neutral. The slurry step is typically conducted at ambient temperature and at atmospheric pressure. Higher temperatures and pressures may be used but are not necessary.

In order to achieve the desired particle size distribution of the kaolin of this invention, it is necessary to perform one or more particle size separations on the kaolin in the slurry. Generally, such processing includes degritting the kaolin slurry of larger particles outside the desired particle size, typically those in larger than 325 mesh, followed by differential gravitational or centrifugal sedimentation to recover a size fraction of desired particle size.

The drying step may be carried out by techniques well known to those of ordinary skill in the art such as flash drying, rotary drying and preferably spray drying.

Spray drying techniques are well-known in the clay industry. As a reference, consult, e.g., "Atomization and Spray Drying," by W. R. Marshall (Chemical Engineering Monograph Series, No. 2, Vol. 50 (1954)), which is hereby incorporated by reference for its teachings in this regard.

A minor amount of a dispersing agent or a flocculating agent may also be incorporated into the mixture to facilitate dispersion/suspension of the particles in the liquid medium.

In spray drying, the kaolin is adjusted, if necessary, by the addition of liquid (preferably water) so that the kaolin slurry is pumpable and sprayable. The concentration of kaolin may preferably be between 45% and 55%. The slurry is then sprayed into an atmosphere of hot, inert (to this product) gases.

Spray dryers of various designs can be used. These dryers may be of the concurrent, countercurrent, or mixed flow type. Nozzles, disks or the like can be used to disperse the slurry into droplets. The temperature of the inlet and outlet air of the spray dryer will depend, of course, on the design of the dryer. The actual internal temperature of the microspheres in the drying chamber should be below 225° F., for example 180° F. to 200° F. At these temperatures, excess free moisture is eliminated from the clay slurry droplets without removing water of hydration (water of crystallization) from the clay. The droplets thus become porous microspheres and are collected downstream of the drying chamber, by the usual methods. Using a concurrent dryer, an air inlet temperature of about 1000° F. to 1200° F. is suggested when the clay slurry is charged at a rate sufficient to produce an air outlet temperature within the range of 250° F. to 300° F.

An example of this invention is included hereinbelow. Of course, this example is not intended as limiting this invention as modification of the example by ordinary expedient will be readily apparent to those of ordinary skill in the art.

Unless otherwise indicated in the following example and elsewhere in the specification and claims, all parts and percentages are by weight, temperatures are in degrees Celsius, pressures are at or near atmospheric.

EXAMPLE 1

A slurry is prepared by mixing 70 parts of East Georgia crude hydrous kaolin, 50 parts water, 0.1 part of 30% aqueous ammonium hydroxide, and 0.66 part of a 30% aqueous solution of sodium hexametaphosphate. The pH of the slurry is adjusted to about 7 with acid or base, if necessary. The slurry is blunged until the kaolin particles are evenly dispersed. The slurry is degritted using a 20 mesh screen and a Bird brand solid bowl centrifuge to remove plus 325 mesh solids. The degritted slurry is then centrifuged using an Alpha Laval brand nozzle bowl centrifuge to obtain the desired particle size distribution. The resulting product is then dried.

The kaolin products of this invention provide significant beneficial properties to cationic deposition primers including i) improved economics by the replacement of titanium dioxide; ii) the kaolin can be provided in spray dried form; iii) improved dispersion in pigment paste; iv) reduced agglomeration in paint baths; and v) improved smoothness of the cured film. The kaolin compositions of this invention can also make up a higher concentration of the pigment used in electrodeposition paint than current standard kaolin grades without increasing the viscosity of the pigment paste, increasing agglomeration in the paint bath or reducing the smoothness of the cured film.

What is claimed:

1. A pigment composition comprising at least one hydrous kaolin, the hydrous kaolin comprising particles having a particle size distribution where 98% of the particles are less than about $2\mu$, 90% are less than about $0.5\mu$, and the particles have a median particle size less than about $0.3\mu$.

2. A composition according to claim 1 wherein the composition has a Gardner-Coleman oil adsorption of less than about 70 lb oil/100 lb pigment.

3. A process for preparing a pigment composition comprising the steps of (i) preparing an aqueous slurry of particles of at least one hydrous kaolin; (ii) separating the particles from said slurry wherein the separated particles have a particle size distribution where 98% of the particles are less than about $2\mu$, 90% are less than about $0.5\mu$ and the particles have a median particle size less than about $0.3\mu$; and (iii) drying the separated particles to provide the pigment composition.

4. A pigment composition prepared according to the process of claim 3.

5. A pigment composition according to claim 1 further comprising at least one grinding vehicle.

6. A pigment composition according to claim 4 further comprising at least one grinding vehicle.

7. A pigment composition according to claim 1 further comprising at least one electrodeposition resin vehicle.

8. A pigment composition according to claim 4 further comprising at least one electrodeposition resin vehicle.

9. A pigment composition according to claim 5, wherein the composition is a pigment paste.

10. A pigment composition according to claim 6, wherein the composition is a pigment paste.

11. A pigment composition according to claim 7, wherein the composition is an electrodeposition paint.

12. A pigment composition according to claim 8, wherein the composition is an electrodeposition paint.

13. A method for the electrodeposition coating of a conductive substrate which comprises applying to said substrate under electrodeposition conditions a coating comprised of at least one composition according to claim 1.

14. A method for the electrodeposition coating of a conductive substrate which comprises applying to said substrate under electrodeposition conditions a coating comprised of at least one composition according to claim 4.

15. An article of manufacture comprising a coated conductive substrate prepared according to claim 13.

16. An article of manufacture comprising a coated conductive substrate prepared according to claim 14.

* * * * *